United States Patent [19]

Applebury

[11] 3,792,629

[45] Feb. 19, 1974

[54] SPEED REDUCER WITH RING AND PLANET GEARS HAVING DIFFERENT CIRCULAR PITCHES

[75] Inventor: Walter T. Applebury, Long Beach, Calif.

[73] Assignee: McDonnell Douglas Corporation, Santa Monica, Calif.

[22] Filed: Dec. 30, 1971

[21] Appl. No.: 214,229

[52] U.S. Cl. .................................................. 74/801
[51] Int. Cl. .............................................. F16h 1/28
[58] Field of Search .............................. 74/801, 803

[56] References Cited
UNITED STATES PATENTS

| 476,101 | 5/1892 | Thomson | 74/801 |
|---|---|---|---|
| 2,547,475 | 4/1951 | Larsen | 74/801 X |
| 253,189 | 2/1882 | Davies | 74/803 |
| 507,695 | 10/1893 | Thomson | 74/801 |
| 1,323,245 | 12/1919 | Borkes | 74/801 |
| 1,431,167 | 10/1922 | McCollum | 74/801 |
| 1,499,763 | 7/1924 | Davis | 74/801 |
| 1,609,076 | 11/1926 | Evans | 74/801 |
| 2,401,875 | 6/1946 | Lawler | 74/801 |

OTHER PUBLICATIONS

"What You Can Do With Nonstandard Spur Gears", pp. 31-33, by Edward A. Brass in Product Engineering, July 31, 1961.

Primary Examiner—Benjamin W. Wyche
Assistant Examiner—J. Reep
Attorney, Agent, or Firm—Robert O. Richardson; Walter J. Jason; Donald L. Royer

[57] ABSTRACT

A single stage speed reducer having a speed reduction ratio capability of from 1:1 to over 100,000:1. Ring gear modification of either or both of a static and a mobile ring gear by removal or addition of a tooth and respacing those remaining without changing the ring gear diameter causes the planet gear to "creep" relative to the ring gear as it orbits about the sun gear, the creep occurring at the planet gear/ring gear interface. This results in a mobile ring gear output of one modified tooth spacing orbit of the planet gear about the sun gear. Other configurations result in a partial tooth spacing output movement per orbit.

2 Claims, 4 Drawing Figures

PATENTED FEB 19 1974 3,792,629

SPEED REDUCER WITH RING AND PLANET GEARS HAVING DIFFERENT CIRCULAR PITCHES

BACKGROUND OF THE INVENTION

In the crowded art of speed reduction it is common practice to use a sun gear to rotate planetary gears which orbit around the sun gear and within a ring gear. The orbiting of the planetary gear is harnessed as the output and has a speed of rotation substantially less than the rotation of the sun gear. This reduced output, in turn, may be used as the input to a second stage for further gear reduction. Thus, a very high gear reduction requires several stages, increasing the cost, weight, complexity, and maintenance problems, and reduces the mechanical efficiency of the reduction system.

SUMMARY OF THE PRESENT INVENTION

The present invention relates to a planetary type speed reducer generally comprising a stationary housing having secured thereto a sun gear adapted to drive a plurality of planetary gears which perform two functions. One is to cooperate with the sun gear and stationary ring gear internally toothed to form an orbit type gear, and the other is to advance or retard a mobile ring gear that serves as the output. This output is obtained by changing the number of teeth on one of the ring gears (adding or omitting only one tooth is preferable), without changing the pitch diameter of the gear. This produces a "creeping" of the planet gear with respect to the ring gear. "Creep" is defined as the relative motion between planet pitch diameter and the modified ring pitch diameter at their point of tangency or point of contact. The amount of creep is equal to the circular width of the tooth or teeth added or omitted per planet orbit. As the planets orbit, the cumulative creep constitutes the motion or output of the speed reducer's mobile ring.

DETAILED DESCRIPTION OF ILLUSTRATIVE EMBODIMENT

Figure 1:
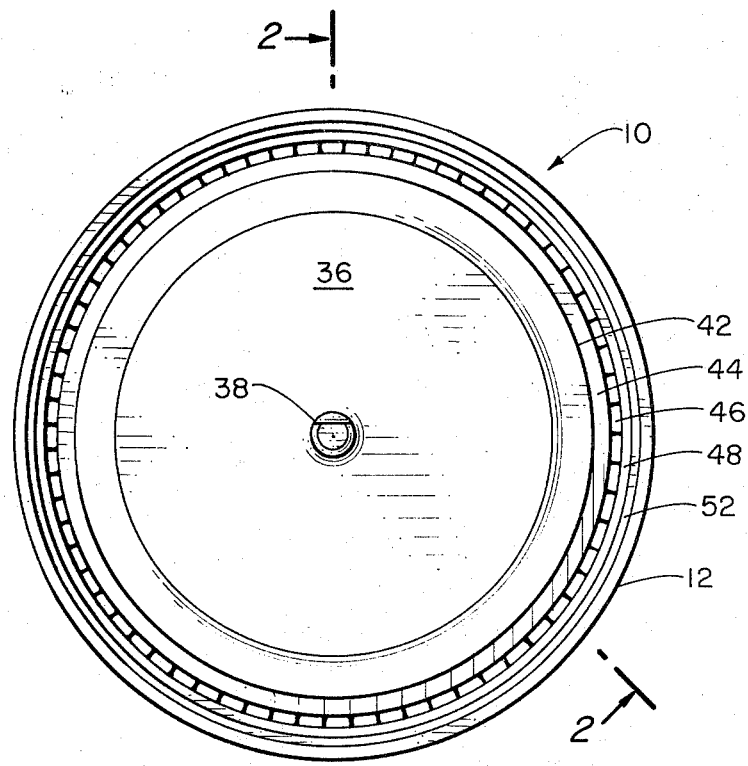
FIG. 1 is an elevational view of the output side of the speed reducer.
Figure 2:
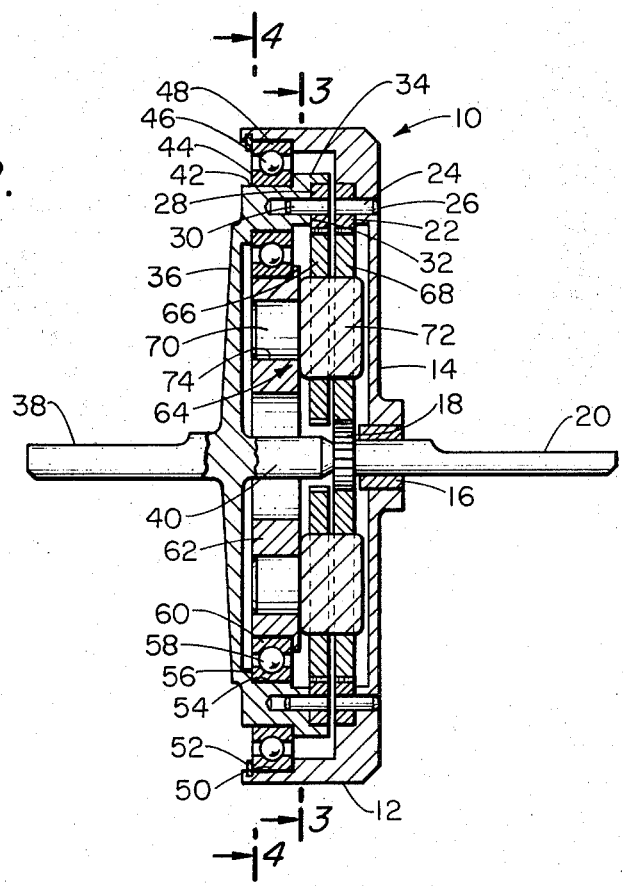
FIG. 2 is a sectional view taken along the line 2—2 in FIG. 1.
Figure 3:
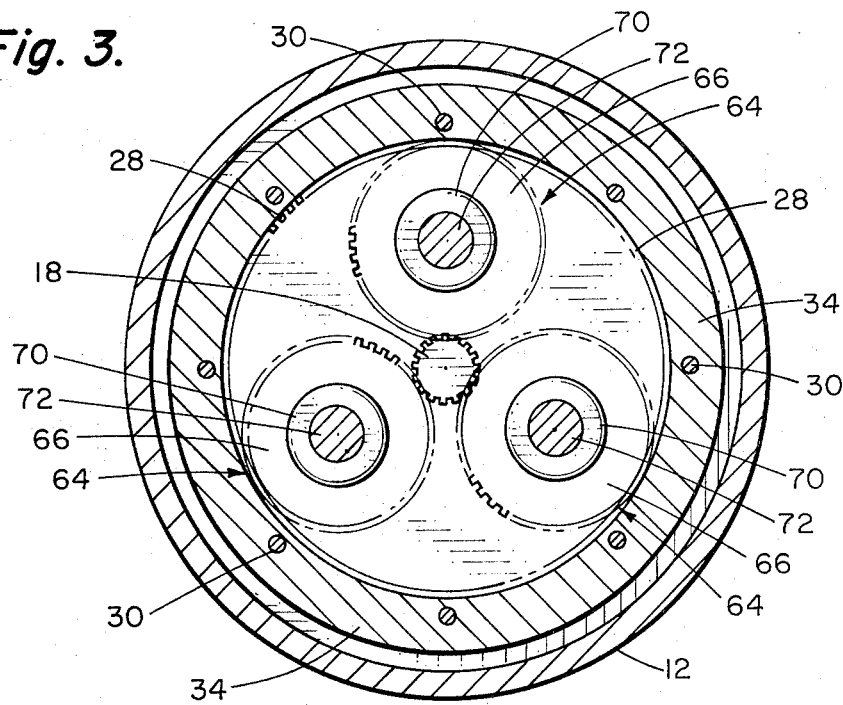
FIG. 3 is a sectional view taken along the line 3—3 in FIG. 2.
Figure 4:
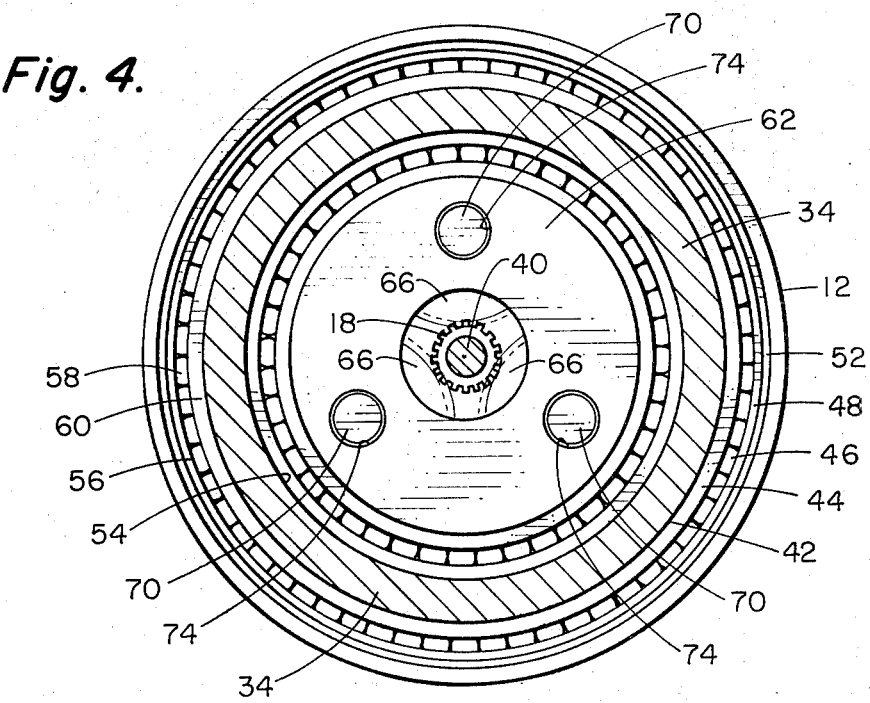
FIG. 4 is a sectional view taken along the line 4—4 in FIG. 2.

A better understanding can be had of the principle of introducing "creep" at the planet gear/ring gear interface by a gear tooth mismatch, i.e., removal of a gear tooth and respacing those remaining without changing the ring gear pitch diameter, to thus cause the mobile planet gear to "creep" as it orbits about the sun gear, by simultaneously referring to all views of one embodiment of a single stage speed reducer apparatus, and thereafter describing several configurations that may be used in achieving this result.

Referring now to the drawings there is shown a circular gear housing 10 having a circumferential flange 12 and a circular wall 14 having a bearing 16 at its axis. A sun gear 18 with drive shaft 20 is rotatably mounted in bearing 16. A static ring gear assembly 22 is positioned within the housing 10 and is non-rotatably mounted therein by pins 24 press fitted in apertures 26 in wall 14.

A mobile ring gear assembly 28 is similarly mounted by pins 30 on the inner face 32 of flange 34 on the periphery of output disc 36 having a driven shaft 38 rotatably positioned at the housing axis end in alignment with drive shaft 20. Driven shaft 38 has an inward extension 40 bearing against the inner face of sun gear 18 to maintain it in proper lateral spacing between the output disc 36 and the housing wall 14.

Flange 34 has an outer peripheral wall 42 on which is mounted the inner race 44 of a ball bearing assembly which includes ball bearings 46 and an outer race 48. The outer race modification) has fits within flange 12 of housing 10 and against a shoulder 50. A retaining ring 52 releasably locks the outer race 48 in this position in affixing the driven shaft 38 to the housing 10.

Flange 34 also has an inner peripheral wall 54 on which is positioned the outer race 56 of another ball bearing assembly which includes ball bearings 58 and an inner race 60. This assembly permits a carrier ring 62, which is affixed to the inner race 60 to rotate relative to ring gear 28. This carrier ring 62 has a plurality of planet gear assemblies 64 mounted thereon. These assemblies include a pair of spaced planet gears 66, 68 joined together and rotatably mounted on shaft 70 through bearing 72. Shaft 70 is positioned in aperture 74 in carrier ring 62. A plurality of such planet gear assemblies 64 are so mounted on the carrier ring 62 for coordination of movement about the sun gear 18 and movement within ring gear assemblies 22 and 28. Planet gear 66 is in a plane with and mates with mobile ring gear 28 and planet gear 68 is in a plane with and mates with static ring gear 22.

In operation, drive shaft 20 and sun gear 18 rotate planet gear 68 about the inside of static ring gear 22 and about the sun gear 18. Companion planet gear 66 also rotates and orbits within mobile ring gear 28. If all gear teeth mesh perfectly in Configurations A and B which follow, there will be no rotation of the mobile ring gear 28 and driven shaft 38 does not rotate. However, with the unique gear spacing of the present invention there is a deliberate mismatch of the gears which will cause mobile ring gear 28 to rotate relative to the static ring gear 22 and driven shaft 38 will rotate in the manner hereinafter described. It should be noted that upon disassembly, different sets of static and mobile ring gears 22, 28, and planet gears 66, 68 may be used to achieve the desired gear and speed reduction for a selected purpose. These different sets of gears generally will be of one of the following configurations:

Configuration A

This is the simplest combination. Creep is produced only between the planet and one ring gear. The other ring gear (it doesn't matter which of the two ring gears is selected for tooth modification) has the standard number of teeth. The maximum speed reduction is limited to an output motion (creep) equal to the width of the number of teeth added or deleted (assume one tooth for the remainder of this explanation) per planet orbit. The two ring gears may have the same or different diametral pitches (tooth size). Diametral pitch is an indicator of tooth size and is expressed as the number of teeth per inch of pitch diameter of the gear. If $CP_1$ = tooth spacing of the modified ring, the speed reduction ratio due to creep is:

$$\text{(Pitch diameter of ring)}/CP_1$$

The total reduction, assuming the sun gear to be the input, is the ordinary planetary reduction (ratio of input rpm to planet orbit rpm) times the above reduction.

Configuration B

This decreases the minimum output speed to a fraction of a tooth's width per orbit. It is required that the two ring gears be of different diametral pitches (tooth size) and, for maximum reduction, this difference should be slight. Each ring gear has the same diametral pitch as the corresponding face on the planetary gear except that each ring gear has one less tooth. The planet will thus creep with respect to both rings, but in opposite directions. Since tooth sizes differ, so will creep, and the motion of the output (mobile) ring will be the difference in tooth spacing (called "circular pitch" or CP). Thus, output motion per planet orbit = $CP_1 - CP_2$, a small amount indeed is, measured at the ring pitch diameter. The reduction ratio is:

$$\text{(Pitch diameter of ring)}/(CP_1 - CP_2)$$

The total reduction, assuming the sun gear to be the input, is the ordinary planetary reduction (ratio of input rpm to planet orbit rpm) times the above reduction.

Configuration C

This adds to configurations A and B, a third reduction technique. Here, one of the ring gears is reduced slightly in pitch diameter to accommodate one less tooth. The corresponding planet face is reduced similarly (and loses one tooth). With no other changes, output motion is produced with any input. Ratios, though, are relatively low. However, when configurations A or B are superimposed upon this device, the above output motion can be reduced, producing, again, very high reduction ratios. This can often be done with configuration A (only one ring producing creep) and therefore may have the advantage of higher efficiency over the B configuration (two opposing creep motions).

Having thus described an illustrative embodiment of the present invention, it is to be understood that modifications thereof will become apparent to those skilled in the art and it is to be understood that these deviations are to be construed as part of the present invention.

I claim:

1. A speed reducer comprising:
   a gear housing having a first ring gear fixedly mounted therein,
   a second ring gear rotatably mounted therein,
   one of said ring gears being larger in pitch diameter by the addition of one tooth thereto,
   a plurality of double faced planet gears whose face gears are of a diameter to fit and mate with said ring gears,
   the faces of said planetary gears having predetermined diametral pitches,
   the ring gear of larger diameter having a circular pitch decreased by one tooth per circumference less than the circular pitch of its associated planetary gear face, and
   a sun gear for driving one of the faces of each of said planetary gears.

2. A speed reducer as in claim 1 wherein the motion of the second ring gear is due to the difference in pitch diameters of the two ring gears offset by creep between the planet gear and said ring gear of larger diameter.

* * * * *

PO-1050
(5/69)

UNITED STATES PATENT OFFICE
CERTIFICATE OF CORRECTION

Patent No. 3,792,629          Dated  19 February 1974

Inventor(s) Walter T. Appleberry

It is certified that error appears in the above-identified patent and that said Letters Patent are hereby corrected as shown below:

On the Title page, correct the spelling of the inventor's name, in both instances, from "Applebury" to --Appleberry--; and in Column 2, Line 14, delete "modification) has" and insert the numeral --48--therefor.

Signed and sealed this 2nd day of July 1974, (SEAL)
Attest:

EDWARD M. FLETCHER, JR.　　　　C. MARSHALL DANN
Attesting Officer　　　　　　　　Commissioner of Patents